United States Patent [19]

Karpathian et al.

[11] 4,367,659
[45] Jan. 11, 1983

[54] TWIN LEVER CONTROL ACTUATOR

[75] Inventors: Kerry Karpathian, Fond du Lac, Wis.; Darrell L. Trowbridge, Burnsville, Minn.

[73] Assignee: Brunswick Corporation, Skokie, Ill.

[21] Appl. No.: 164,724

[22] Filed: Jun. 30, 1980

[51] Int. Cl.³ .............................................. F16C 1/10
[52] U.S. Cl. ............................ 74/501 R; 74/10.7; 74/99 R; 74/531
[58] Field of Search .............. 74/501 R, 487, 496, 74/108, 10.7, 506, 99 R

[56] References Cited

U.S. PATENT DOCUMENTS

| | | | |
|---|---|---|---|
| 462,993 | 11/1891 | Pfetch | 74/506 |
| 1,551,823 | 9/1925 | Guy | 74/501 |
| 2,384,742 | 9/1945 | Hewitt | 74/501 |
| 2,544,853 | 3/1951 | Oates | 74/501 |
| 2,844,039 | 7/1958 | Spakman | 74/10.7 |
| 2,884,109 | 4/1939 | Morse | 74/501 |
| 2,890,593 | 6/1959 | Brouse | 74/394 |
| 3,160,027 | 12/1964 | Waner | 74/501 |
| 3,828,624 | 8/1974 | Wiegand | 74/501 |

Primary Examiner—Kenneth Dorner
Attorney, Agent, or Firm—O. T. Sessions

[57] ABSTRACT

A twin lever control actuator (10) for operating push-pull cables (17) has two sets of two pulleys (12, 13), one set on each side of a control body (11). The cable cores (18) are attached to the pulley cables (15) on the straight run of pulley cable between the pulleys to provide linear actuation of the push-pull cables (17). A ball detent (52) or a friction pad (58) can be used to provide an adjustable control load.

17 Claims, 4 Drawing Figures

TWIN LEVER CONTROL ACTUATOR

DESCRIPTION

1. Technical Field

This invention relates to actuating devices for flexible push-pull cables and particularly to actuators using a drive wheel to move the core of a push-pull cable.

2. Background Art

Prior push-pull cable actuators using a circular drive wheel have required bending of the cable core to coact with the drive wheel. Examples of such devices are found in U.S. Pat. Nos. 3,828,624 and 2,890,593. Another device shown in U.S. Pat. No. 3,160,027 uses a flexible belt to transfer both compression and tension loads to a cable core.

DISCLOSURE OF INVENTION

In one embodiment an actuator assembly for moving the core of a push-pull cable relative to its sheath has a control body supporting a central arm pulley and an idler pulley. The pulley cable carries an attachment device to attach an end of the push-pull cable core to the pulley cable between the pulleys. A support holds the core of the push-pull cable parallel to the straight run of pulley cable between the pulleys, thus providing linear actuation of the cable core with no movement of the sheath. The invention may also be practiced in a dual controller having similar mechanisms on opposite sides of the controller body.

In one aspect of the invention adjustable friction devices are provided for the pulley wheels to provide a force resisting rotation of the pulleys and thus control movement. In one form the friction device may be a ball detent while another form may be a friction pad. Both the ball detent and the friction pad may be interchangeable to provide flexibility in the application of the actuator assembly.

Other features of the invention include a mechanism for attaching the pulley cables to the pulley which also serves to adjust the pulley cable tension and a mounting arrangement which uses the mounting lugs to limit the control movement. Cams may be provided on the control pulleys to actuate electrical switches to provide interaction with the electrical system of the controlled device.

BEST MODE FOR CARRYING OUT THE INVENTION

Figure 1:
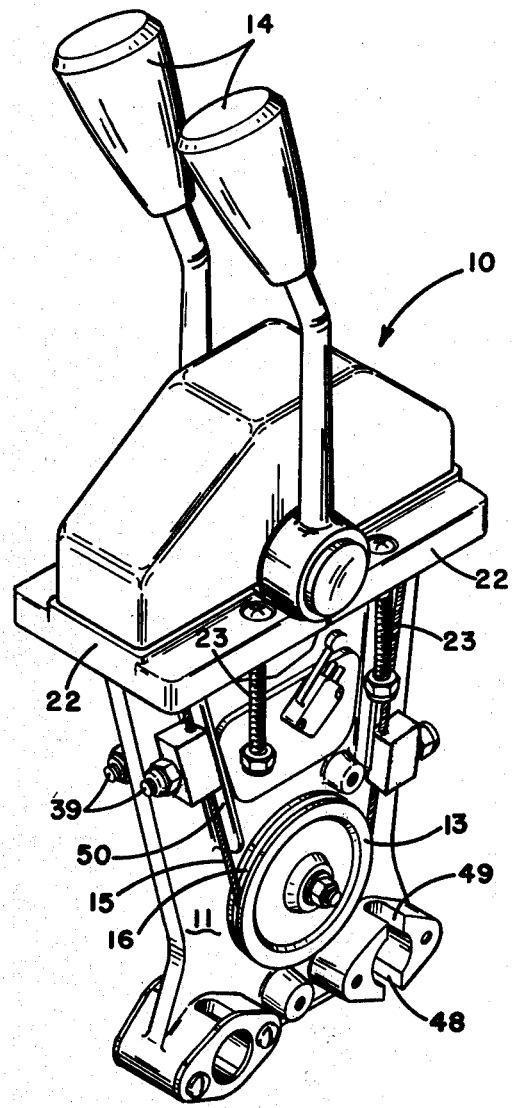
FIG. 1 is a perspective view of the twin lever control actuator of the invention.
Figure 2:
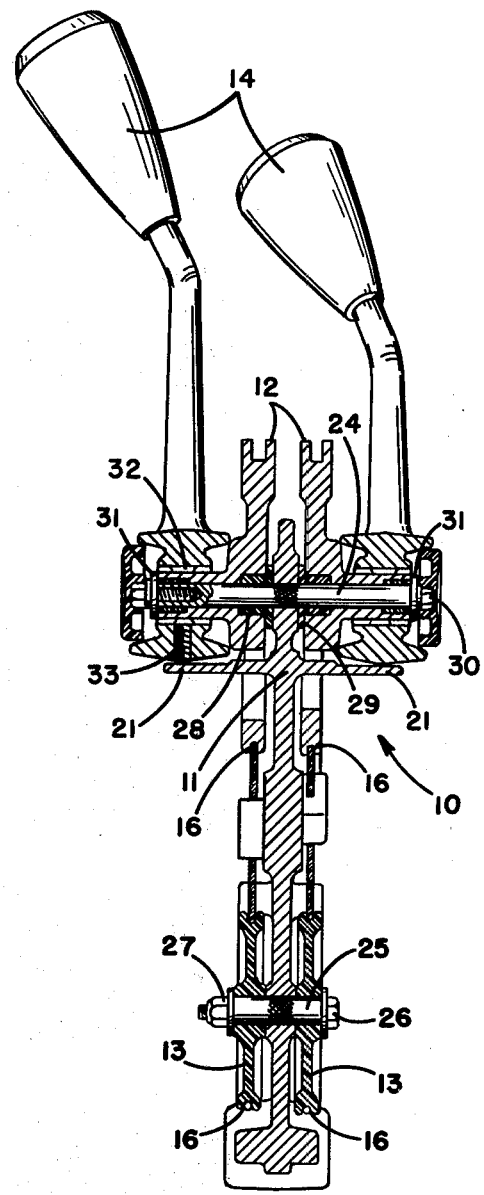
FIG. 2 is a sectional view in elevation of the control actuator of the invention.

Illustrated in the drawings is a dual lever control actuator 10 for operating the clutch and throttle of a remotely located marine propulsion device such as an outboard motor or a stern drive, not illustrated. The dual lever actuator 10 includes a control body 11 supporting two identical control arm pulleys 12 and two idler pulleys 13. Control levers 14 are attached to the control arm pulleys 12. A pulley cable 15 is mounted in the circumferential grooves 16 on each pulley of the pulley sets and is attached to the control arm pulley 12. A push-pull cable 17 is mounted on each side of the actuator 10 with its core attached to the pulley cable and its sheath attached to the control body 11 to provide linear movement of the core element.

The die cast aluminum control body 11 includes two end mounting lugs 20 and two side mounting plates 21 for supporting the actuator on any appropriate surface. The mounting arrangement includes two plastic base sections 22 having elements which fit under the mounting lugs 20 and plates 21 and are held in place by mounting screws 23 which pass through both the base sections 22 and the side mounting plates 21 to affix the actuator 10 to the appropriate surface. Projections on the base sections interlock with holes, not illustrated, on the plastic cover to removably hold the cover in place.

Two steel shafts 24 and 25 are force fit through the control body 11. The first of these shafts 24 supports the two control arm pulleys 12 for rotation and the second shaft 25 supports the two plastic (Delrin) idler pulleys 13. The idler pulleys 13 are retained in place by a bolt 26 and nut 27 extending axially through the tubular idler shaft 25. Two nylon bushings 28 serve as bearings for the control arm pulleys 12, and nylon washers 29 are used to separate the aluminum pulleys 12 from the control body 11. The control arm pulleys 12 are retained on the shaft by machine screws 30 which thread into the shaft 24 and bear on washers 31 and the nylon bushings 28. The control levers 14 are attached by splines 32 and set screws 33 to the control arm pulleys 12.

The two pulley cables 15 carried by the pulleys 12 and 13 are attached to the control arm pulleys 12. Each of the cables 15 has a male threaded fitting 34 and a plug 35, swaged on opposite ends. The plugged 35 ends are retained in notches 36 at the end of the pulley grooves 16, the cables 15 are looped around the idler pulleys 13, and nuts 37 are used to adjust the cable tension against the radial face 38 on the control arm pulley 12. Rectangular threaded stud blocks 39 are also swaged to the pulley cable 15 between the pulleys to provide a means for attaching the cores of the push-pull cables 17 to the pulleys cables 15.

To limit the rotation of the control arm pulleys 12, stops 40 are provided on the control body 11. The side mounting plates 21 project through the openings 41 in the control arm pulleys 12. Abutments or stop surfaces 40 on each end of the side mounting plates 21 coact with stop surfaces 42 on the control arm pulley 12 to limit the control arm pulleys to 90 degrees of rotation. The system of stops serves to limit the movement of the pulley cable stud blocks 39 to the straight run of pulley cable between the pulleys.

Conventional flexible push-pull cables 17 are connected to the actuator 10. The cable end has a rigid tube 43 at the end of the cable sheath and a rigid bar 44 at the end of the cable core coaxial therewith. Holes 45 in the flattened ends of the bars 44 fit on the threaded studs 39 on the pulley cables 15 and are attached with lock nuts 46 to prevent any lost motion between the pulley cable 15 and the push-pull cable core. A coupling barrel 47 affixed to the cable tube 43 fits into a bore 48 in the control body 11 with the cables passing through the slots 49 while a retainer plate holds the coupling barrel 47 in place to attach the tube 43 to the control body 11. Two attachment points are provided on each side of the control body 11 to permit flexibility in the use of the actuator 10. Ridges 50 are provided on the control body 11 parallel to the straight run of pulley cable to stabilize the push-pull cable ends under heavy loads.

Figures 3, 4:
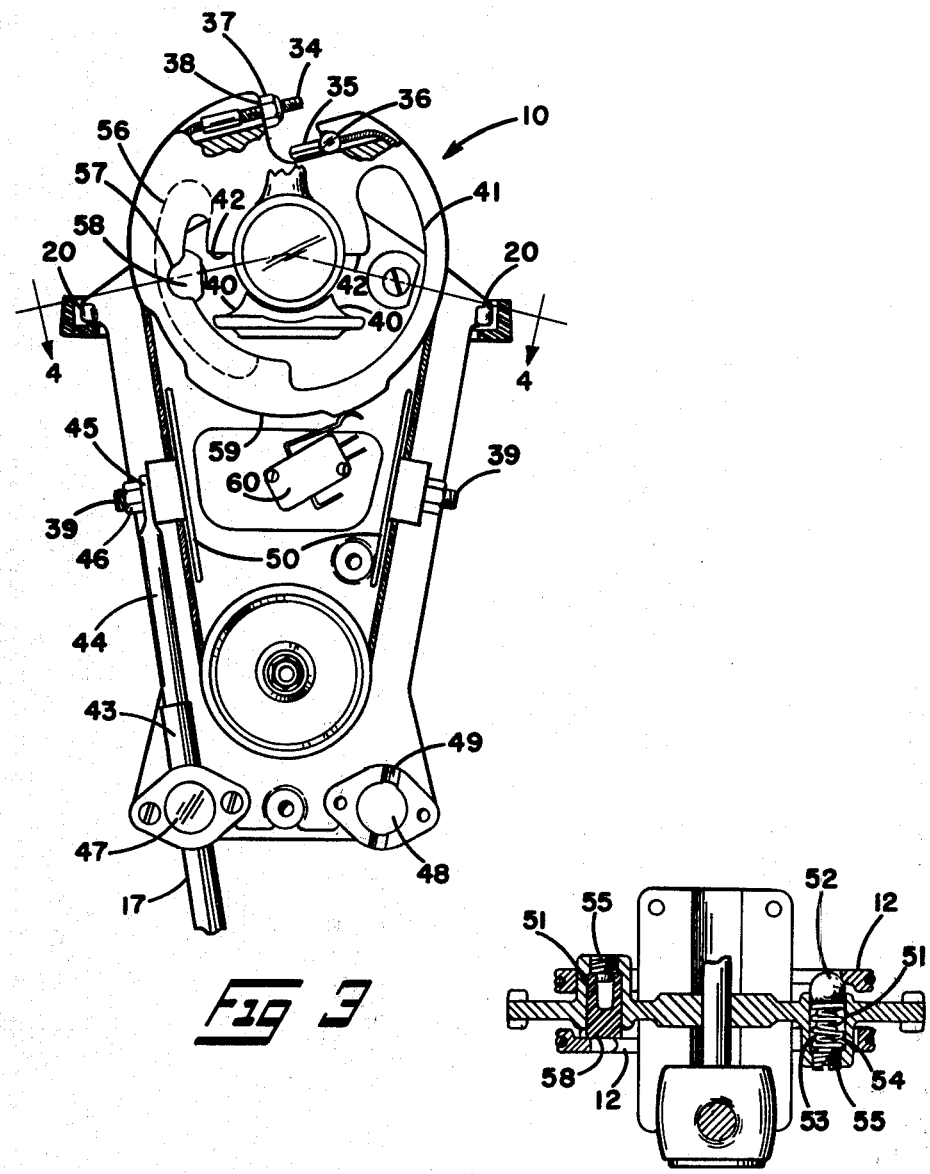
FIG. 3 is a side view of the actuator of FIG. 1.
FIG. 4 is a partial sectional view along line 4—4 of FIG. 3.

Adjustable control loading is provided by friction devices housed in bores 51 in the control body 11, as shown in FIG. 4. A ball detent including a ball 52 and two concentric coil springs 53 and 54 may be used. The inner coil spring 53 is adjustably loaded by an adjustment screw 55 engaged with the control body 11. Access to the adjustment screw 55 is readily available since the housing extends through the slot 41 in the opposite pulley 12. The ball 52 is biased against a smooth cast surface 56, shown by dotted lines in FIG. 3, on the inner face of the control arm pulley 12. A detent notch 57 cut through the control arm pulley 12 provides the detent action. By using the adjustment screw 55 to control the spring bias on the detent ball 52, both the control load resisting the rotation of the control arm pulley 12 and the detent load may be set at a desired level. The detent is particularly suitable for use in controlling a gear shifter where a neutral detent is desirable.

Alternatively a nylon friction pad 58 may be housed in the bore 51 and loaded against the control arm pulley 12 by the adjustment screw 55. The friction pad 58 rides against the surface 56 on the control arm pulley 12 and is large enough to bridge the detent notch 57. Thus a desired uniform friction load may be provided against the control arm pulley 12 to provide a smooth control load suitable for an engine throttle controller, for example. This arrangement provides flexibility in application of the controller, since the control actuator may be easily modified to provide two throttle controllers, two shift controllers, or one throttle and one shift controller by merely installing the appropriate friction device.

Cam surfaces 59 are provided on the outer rims of the control arm pulleys 12 to activate electrical switches. For example, a neutral safety switch 60 could be controlled by the cam 59 when the control arm pulley 12 is used to control a gear shifter on an outboard motor. Such a switch would prevent starting the outboard motor engine except when the gear shifter is in its neutral position.

We claim:

1. An actuator assembly for moving a core of a push-pull cable relative to a cable sheath comprising:
   (A) a control body;
   (B) a control arm pulley mounted for rotation on said control body;
   (C) an idler pulley mounted for rotation on said control body;
   (D) a pulley cable carried on rims of said pulleys;
   (E) an attachment means for attaching one end of the core of said push-pull cable to said pulley cable between said pulleys; and
   (F) a support means to hold said end of said core parallel to a straight run of said pulley cable.

2. The actuator assembly defined in claim 1 wherein said pulley cable has two ends and each of said ends are attached to one of said pulleys.

3. The actuator assembly defined in claim 2 wherein both of said ends are attached to said control arm pulley.

4. The actuator assembly defined in claim 3 further comprising a stop means for limiting the rotation of said pulleys.

5. The actuator assembly defined in claim 1 further comprising a friction pad supported between one of said pulleys and said control body to provide a force resisting rotation of said pulleys.

6. The actuator assembly defined in claim 1 further comprising a detent means between one of said pulleys and said control body to provide a detent action in the rotation of said pulleys.

7. The actuator assembly defined in claim 6 wherein said detent means comprises a ball and a spring biasing said ball against one of said pulleys.

8. The actuator assembly defined in claim 4 wherein said control arm pulley includes a cam means on its rim for actuating an electrical switch.

9. An actuator assembly for moving cores of push-pull cables relative to their sheaths comprising:
   (A) a generally planar control body;
   (B) first and second shafts extending through the plane of said control body;
   (C) first and second control arm pulleys mounted for rotation on said first shaft on opposite sides of said control body;
   (D) first and second idler pulleys mounted for rotation on said second shaft on opposite sides of said control body;
   (E) first and second pulley cables carried on rims of said first and second pulleys, respectively, each of said pulley cables including attachment means for attaching an end of the core of a push-pull cable; and
   (F) support means to hold said ends of said cores parallel to a straight run of said pulley cables.

10. The actuator assembly defined in claim 9 wherein said first and second pulley cables are attached to said first and second control arm pulleys, respectively.

11. The actuator assembly defined in claim 10 further including first and second friction means for providing a force resisting rotation of said first and second pulleys, respectively.

12. The actuator assembly defined in claim 11 wherein said first and second friction means each comprise a housing on said control body, a contact member mounted in said housing and having a surface contacting one of said control arm pulleys, and an adjustment means for adjusting the contact force between said contacting surface and said control arm pulley.

13. The actuator assembly defined in claim 12 wherein at least one of said contact members is a ball and at least one of said control arm pulleys includes a notch for coacting with said ball to provide a detent action.

14. The actuator assembly defined in claim 9 or 12 wherein said control body comprises abutments on each side of said plane and said first and second control arm pulleys each comprise a stop to coact with one of said abutments to limit the rotation of said control arm pulley.

15. The actuator assembly defined in claim 12 wherein said control arm pulleys each include a slot and said control body includes mounting lugs extending through said slots.

16. The actuator assembly defined in claim 15 wherein said mounting lugs each include abutments and said slots include stop surfaces to act with said abutments to limit the rotational movement of said control arm pulleys.

17. The actuator assembly defined in claim 12 wherein the outer rims of said first and second control arm pulleys each include cam surfaces for actuating electrical switches.

* * * * *